Nov. 22, 1966 H. M. SCHLICKE 3,287,666

TRANSFORMATION NETWORK FOR CHANGING A CIRCUIT EXHIBITING GYRATOR CHARACTERISTICS TO A CIRCUIT EXHIBITING ISOLATOR CHARACTERISTICS

Filed Aug. 4, 1964

INVENTOR
HEINZ M. SCHLICKE

BY Arnold J. Eisen

ATTORNEY

United States Patent Office 3,287,666

Patented Nov. 22, 1966

3,287,666

TRANSFORMATION NETWORK FOR CHANGING A CIRCUIT EXHIBITING GYRATOR CHARACTERISTICS TO A CIRCUIT EXHIBITING ISOLATOR CHARACTERISTICS

Heinz M. Schlicke, Fox Point, Wis., assignor to Allen-Bradley Company, Milwaukee, Wis., a corporation of Wisconsin Filed Aug. 4, 1964, Ser. No. 387,327
3 Claims. (Cl. 333—24.1)

Figure 1:
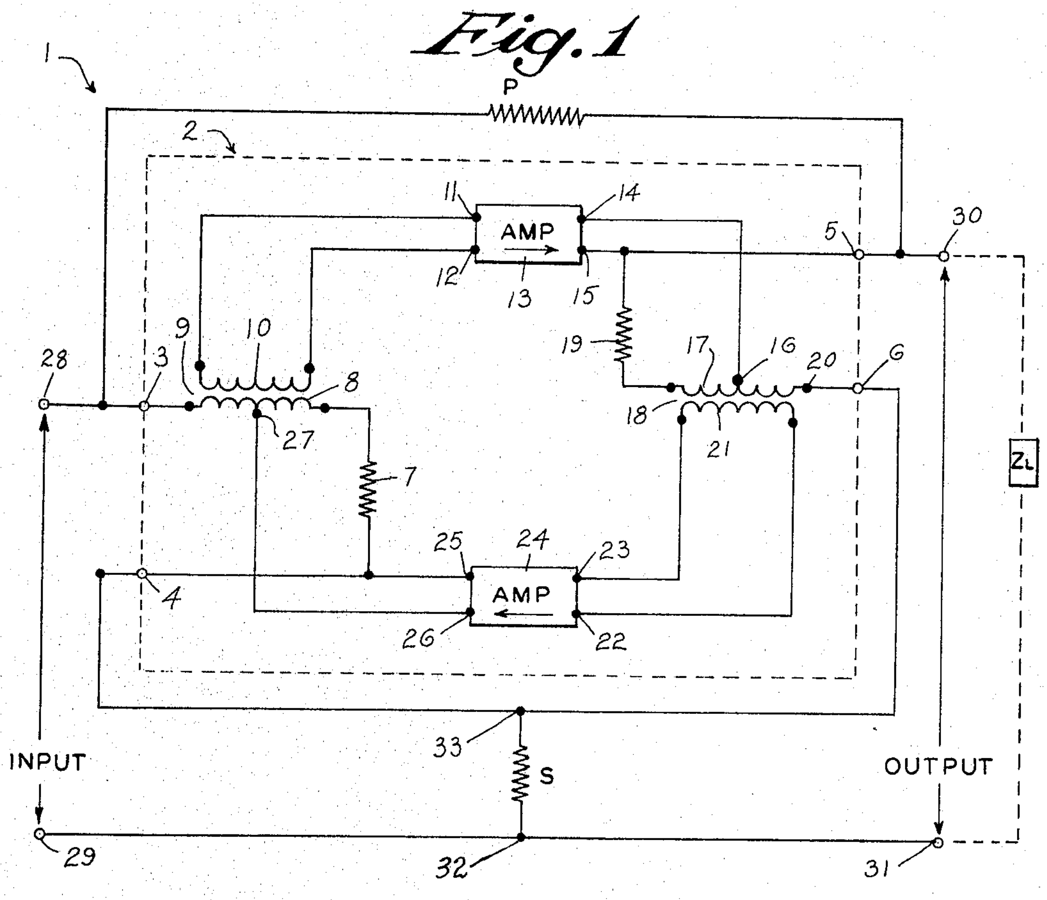

The present invention relates to electronic circuitry having an initial four-pole network and which by proper selection of resistive feedback provisions is transformed into circuitry having electrical characteristics of an entirely different circuit. More specifically, the invention provides circuitry which initially has electrical characteristics corresponding to a gyrator circuit and which by the proper combination of positive parallel feedback and series feedback provisions is transformed into circuitry having electrical characteristics corresponding to a stabilized isolator circuit.

In this invention a gyrator will be defined as a four-pole electrical network which when looking into the input terminals of the network changes a load impedance connected to the output terminals of the network to the inverse of the load impedance multiplied by the square of the gyrating impedance, i.e. the impedance characterizing the gyrator. The present invention is primarily interested in gyrators having a characterizing impedance that is predominately resistive. Thus, letting R represent the inherent gyrating impedance, $Z_L$ the load impedance and $Z_{in}$ the input impedance when looking into the gyrator input terminals, $Z_{in}=R^2/Z_L$.

An isolator will be understood to be a four-pole device which transfers electrical energy in one direction only, and for purposes of this invention is presumed to have an input impedance that is predominantly resistive.

Also in the description, four-pole networks include networks having a pair of input terminals and a pair of output terminals, and also includes networks which have one input terminal connected in common with one output terminal, either internally or externally.

For those who are more familiar with matrix algebra, a gyrator, having a predominantly resistive characterizing impedance, is a four-pole device which has an admittance matrix $$||Y||=\left\|\begin{matrix} O & \frac{1}{R} \\ \frac{1}{R} & O \end{matrix}\right\| \quad (1)$$

with R as previously defined. An isolator is a four-pole device which when possessing a predominately resistive input impedance has an admittance matrix $$||Y||=\left\|\begin{matrix} \frac{1}{R_1} & O \\ \frac{2}{R_1} & -\frac{1}{R_1} \end{matrix}\right\| \quad (2)$$

with $R_1$ representing the input impedance of the isolator.

There are numerous applications, for example in the analog field, where it is necessary to have a circuit network possessing gyrator characteristics part of the time and isolator characteristics during another period. Commonly, applications with these demands are met by incorporating various individual circuits, each of which has either gyrator or isolator characteristics. When the application demands the characteristic inherent of a gyrator or isolator circuit, an entire gyrator or isolator circuit is switched into the circuit network. However, during the time the gyrator or isolator characteristic is not needed the circuit possessing the unwanted characteristic remains idle while other circuits are switched in and out to perform their specific function.

The circuitry of the present invention teaches, that rather than having a plurality of gyrator and isolator networks, that by taking a single gyrator network and providing parallel and series feedback provisions, the resultant circuit performs as a stabilized isolator. The invention permits, that if those practicing the invention select proper materials so that the resistance of the feedback paths can be changed by other than physical means, e.g. by light or electrical fields, the transformation may be made instantly and without any physical contact to the network. Also, by proper selection of the resistive values of the feedback paths, the resultant circuit remains stable to changes in the external resistive values.

Accordingly, an object of the present invention is to provide a flexible and versatile electronic circuit network which by the external switching of feedback parameters changes the electrical characteristics of the network from that of a gyrator circuit to an isolator network.

Another object of the present invention is to provide a stabilized isolator circuit resulting from the combination of a gyrator network and properly selected resistive feedback paths.

The foregoing and other objects will appear in the description to follow. In the description, reference is made to the accompanying drawings which form a part hereof and in which there is shown by way of illustration a specific embodiment in which this invention may be practiced. This embodiment will be described in sufficient detail to enable those skilled in the art to practice this invention, but it is to be understood that other embodiments of the invention may be used and that changes may be made in the embodiments of the invention without deviation from the scope of the invention. Consequently, the following detailed description is not to be taken in the limiting sense; instead, the scope of the present invention is best defined by the appended claims.

Figure 2A:
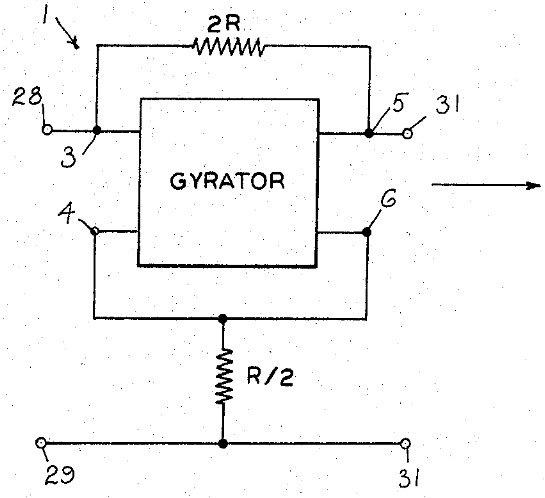
Figure 2B:
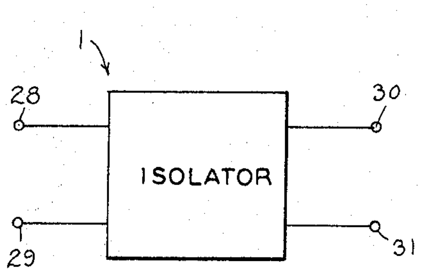

In the drawings:

FIG. 1 is a diagrammatic wiring diagram of a four-pole gyrator circuit having external parallel and series feedback provisions; and FIGS. 2*a* and 2*b* are diagrammatic block diagrams illustrating the transformation of the gyrator circuit of FIG. 1 to a stabilized isolator circuit.

There are numerous gyrator circuits available which may be incorporated to practice the present invention. However, as means of illustration, FIG. 1 illustrates a gyrator circuit which may be incorporated in combination with a parallel and a series feedback path to provide a four-pole isolator network. In FIG. 1, the resultant isolator circuit is designated by the general reference character 1. The initial four-pole gyrator circuit is included within the broken line blocked diagram designated by the general reference character 2. The gyrator circuit 2, as shown herein for illustrative purposes, has a pair of input terminals (poles) 3 and 4 and a pair of output terminals (poles) 5 and 6. In series with the input terminals 3 and 4 is a resistive component 7 and a primary winding 8 of a transformer 9. The transformer 9 has a secondary winding 10 connected across a pair of input terminals 11 and 12 of an amplifier 13. The amplifier 13 has a pair of output terminals 14 and 15 such that the forward amplifying direction is as designated by the arrow. The output terminal 14 is connected to a center tap 16 of a primary winding 17 of a transformer 18. In series with the output terminal 15 of the amplifier 13 and the primary winding 17 is a resistive component 19. The primary winding 17 has a connecting terminal 20 which is common with the output terminal 6. The transformer 18 has a secondary winding 21 connected across a pair of input terminals 22 and 23 of an amplifier 24. The amplifier 24 has a pair of output terminals 25 and 26 such that the forward amplifying direction is as designated by the arrow. The output terminal 25 is connected in series with the resistor 7 and a center tap terminal 27 of the primary winding 8 of the transformer 9.

The resultant isolator circuit 1 has a pair of input terminals 28 and 29 to receive an input signal as designated by the arrowed INPUT line. The output of the network 1 is received across a pair of output terminals 30 and 31 as designated by the arrowed OUTPUT line. Across the output terminals 30 and 31 may be received a load impedance as designated by the block diagram $Z_L$. A parallel feedback path is provided by a resistive component P which extends between the input terminal 28 and the output terminal 30 of the network 1. A series feedback path is provided by the resistive component S which has a terminal 32 connected in common with the input terminal 29 and the output terminal 31. The component S has a second terminal 33 which is common to the input terminal 4 and the output terminal 6 of the gyrator circuit 2.

FIG. 2*a* illustrates the gyrator of FIG. 1, by block diagram form, with a parallel resistive feedback path having a resistance value twice the gyrating impedance R characterizing the gyrator. The circuit of FIG. 2*a* also has a series resistive feedback path having a resistance value equal to one half the gyrating impedance R characterizing the gyrator circuit. This combination of circuitry provides a stabilized isolator having a predominantly resistive input impedance equal to the gyrating impedance R. By selecting the resistive values of parallel and series feedback paths to be 2R and $R/2$, respectively, the resulting isolator is stabilized whereby small changes in the resistance value of the external components has little or no effect on the isolator.

To illustrate, in the definitions a gyrator was defined as a four-pole device having an admittance matrix $$\|Y\| \text{equal to} \left\|\begin{matrix} O & \frac{1}{R} \\ \frac{1}{R} & O \end{matrix}\right\| \tag{1}$$

wherein R represents the gyrating impedance characterizing a predominately resistive gyrator. An isolator circuit was defined as a four-terminal device having an admittance matrix $$\|Y\| \text{equal to} \left\|\begin{matrix} \frac{1}{R_1} & O \\ \frac{2}{R_1} & -\frac{1}{R_1} \end{matrix}\right\| \tag{2}$$

wherein $R_1$ represents the input impedance of a predominately resistive isolator. It will be seen that the admittance matrix $\|Y\|$ of the circuitry of FIG. 1 is $$\left\|\begin{matrix} \frac{S}{R^2}+\frac{1}{P} & \frac{R-S}{R^2}-\frac{1}{P} \\ \frac{R+S}{R^2}+\frac{1}{P} & -\left(\frac{S}{R^2}+\frac{1}{P}\right) \end{matrix}\right\| \tag{3}$$

Now if the resistive value of the feedback path P is approximately equal to twice the gyrating impedance R characterizing the gyrator and the resistance value of the series feedback path S is equivalent to approximately one half the gyrating impedance R, the admittance matrix of the network of FIG. 1 becomes $$\left\|\begin{matrix} \frac{R}{2R^2}+\frac{1}{2R} & \frac{R-R/2}{R^2}-\frac{1}{2R} \\ \frac{R+R/2}{R^2}+\frac{1}{2R} & -\left(\frac{1}{2R}+\frac{1}{2R}\right) \end{matrix}\right\| \tag{4}$$

or $$\left\|\begin{matrix} \frac{1}{R} & O \\ \frac{2}{R} & -\frac{1}{R} \end{matrix}\right\| \tag{5}$$

It is evident from our definitions that the resultant admittance matrix (5) of the circuitry of FIGURE 1 is the same as that of an isolator having an input impedance equal to the gyrating impedance R characterizing the gyrator. Reviewing the admittance matrices 3 and 4 makes it apparent that if the resistive values of the external components making up the parallel resistive path P and the series resistive S change by a comparable amount that the changes have no effect as to the overall stability of the system of FIG. 1. Consequently the stability is solely dependent upon the internal characteristics of the gyrator circuit rather than upon the gyrator circuit and the external resistive paths. In reviewing the matrix (3), it may be noted that all the matrix terms have a P and an S term and that the S terms appear in the numerator and the P terms in the denominator. Thus if there are small changes in the P and S values, and if the changes in the values are both positive or both negative, they tend to cancel each other.

From this analysis it is seen that the dual splitting of the feedback in the gyrator circuit is an effective means for providing a stabilized isolator circuit. Also, it is evident that by the proper selection of the resistance values of the dual feedback provisions, a circuit initially having gyrator characteristics can be switched into a circuit having isolator characteristics, and then by switching the external components a second time so that the feedback provisions P and S are open and short circuited, respectively, the circuit returns to its original nature.

I claim:

1. In a circuit for transformation from a gyrator characteristic to an isolator characteristic the combination of:
- a gyrator circuit having a pair of input terminals and a pair of output terminals,
- a resistive parallel feedback path, said parallel path extending from one input terminal to one output terminal; and
- a resistive series feedback path having resistance value-changing characteristics comparable to those of the parallel feedback path and a resistance value of approximately one-fourth the resistance value of the parallel feedback path, said series path having a terminal common with the other input terminal and the other output terminal, and said series path having a second terminal providing a circuit terminus.

2. A circuit in accordance with claim 1 wherein said gyrator circuit has a predominantly resistive gyrating impedance.

3. In a circuit for transformation from a gyrator characteristic to an isolator characteristic the combination of:
- a gyrator circuit having a predominantly resistive characterizing impedance and a pair of input terminals and a pair of output terminals;
- a resistive parallel feedback path, said parallel feedback path having a resistive value of approximately twice the characterizing impedance of said gyrator, said parallel feedback path extending from one input terminal to one output terminal; and a resistive series feedback path having resistance value-changing characteristics comparable to those of the parallel feedback path, said series feedback path having a resistive value of approximately one half the characterizing impedance of said gyrator, said series feedback path having a terminal common with the other input terminal and the other output terminal, and said series path having a second terminal providing a circuit terminus.

References Cited by the Examiner

UNITED STATES PATENTS

| | | | |
|---|---|---|---|
| 2,944,220 | 7/1960 | Tellegen | 333—24.1 X |
| 3,187,267 | 6/1965 | Merington | 330—103 X |

OTHER REFERENCES

Schlicke: Essentials of Dielectromagnetic Engineering, John Wiley and Sons, New York, 1961, TK7835S28, p. 204 relied on.

HERMAN KARL SAALBACH, *Primary Examiner.*

P. L. GENSLER, *Assistant Examiner.*